United States Patent
Lahiri et al.

(10) Patent No.: US 11,334,445 B2
(45) Date of Patent: May 17, 2022

(54) USING NON-VOLATILE MEMORY TO IMPROVE THE AVAILABILITY OF AN IN-MEMORY DATABASE

(71) Applicant: Oracle International Corporation, Redwood Shores, CA (US)

(72) Inventors: Tirthankar Lahiri, Palo Alto, CA (US); Martin Reames, Minneapolis, MN (US); Kao Makino, San Carlos, CA (US); Ananth Raghavan, San Francisco, CA (US); Chih-Ping Wang, Palo Alto, CA (US); Mutsumi Kogawa, Foster City, CA (US); Jorge Luis Issa Garcia, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 16/232,860

(22) Filed: Dec. 26, 2018

(65) Prior Publication Data
US 2020/0125457 A1    Apr. 23, 2020

Related U.S. Application Data

(60) Provisional application No. 62/748,364, filed on Oct. 19, 2018.

(51) Int. Cl.
*G06F 16/23* (2019.01)
*G06F 11/14* (2006.01)

(52) U.S. Cl.
CPC ...... *G06F 11/1469* (2013.01); *G06F 11/1474* (2013.01); *G06F 16/2358* (2019.01); *G06F 16/2379* (2019.01); *G06F 2201/84* (2013.01)

(58) Field of Classification Search
CPC ............. G06F 11/1469; G06F 16/2379; G06F 16/2358; G06F 11/1474; G06F 2201/84
(Continued)

(56) References Cited

U.S. PATENT DOCUMENTS

| 6,125,368 A | 9/2000 | Bridge et al. |
| 6,351,754 B1 | 2/2002 | Bridge et al. |

(Continued)

OTHER PUBLICATIONS

Craig Mullins, in-memory database managemtn system (IMDBMS), Feb. 2015, <https://searchdatamanagement.techtarget.com/definition/in-memory-database-management-system-IMDBMS> (Year: 2015).*

(Continued)

*Primary Examiner* — Hosain T Alam
*Assistant Examiner* — Robert F May
(74) *Attorney, Agent, or Firm* — Hickman Becker Bingham Ledesma LLP

(57) ABSTRACT

In an in-memory database management system, non-volatile random access memories (NVRAMs) are used to store database data and control data. Because this data is stored in NVRAM, the data survives system failures. Recovery from a system failure may be accomplished more quickly by, at least in part, modifying the surviving data in NVRAM, rather than loading an entire checkpoint image and applying uncheckpointed transactions needed to synchronize the database. Because in this form of recovery the database state that serves as the starting point for applying change records is the database as stored in the NVRAM, this form of recovery is referred to herein as in-memory-based recovery. Recovery, where the database state that serves as the starting point for applying change records is a checkpoint image, is referred to herein as checkpointed-based recovery. In-memory-based recovery eliminates or reduces the need to perform certain operations that are performed for checkpointed-based recovery.

14 Claims, 5 Drawing Sheets

(58) Field of Classification Search
USPC .......................................................... 707/648
See application file for complete search history.

(56) References Cited

U.S. PATENT DOCUMENTS

| | | | | |
|---|---|---|---|---|
| 6,411,968 | B2* | 6/2002 | Bamford | G06F 11/1471 |
| 8,429,134 | B2 | 4/2013 | Chan | |
| 9,223,843 | B1* | 12/2015 | Madhavarapu | G06F 16/2358 |
| 9,298,564 | B2 | 3/2016 | Lee et al. | |
| 9,817,587 | B1* | 11/2017 | Leshinsky | G06F 3/0688 |
| 10,664,361 | B1* | 5/2020 | Carr | G06F 3/0619 |
| 2007/0192384 | A1* | 8/2007 | Shodhan | G06F 16/2358 |
| 2009/0240664 | A1 | 9/2009 | Dinker et al. | |
| 2011/0060724 | A1* | 3/2011 | Chan | G06F 11/1469 |
| | | | | 711/E12.001 |
| 2012/0054533 | A1 | 3/2012 | Shi et al. | |
| 2013/0339572 | A1 | 12/2013 | Fanning et al. | |
| 2014/0172803 | A1* | 6/2014 | Diaconu | G06F 16/1873 |
| | | | | 707/649 |
| 2015/0120659 | A1 | 4/2015 | Srivastava et al. | |
| 2015/0121126 | A1* | 4/2015 | Bradshaw | G06F 11/079 |
| | | | | 714/6.3 |
| 2015/0134616 | A1* | 5/2015 | Zheng | G06F 11/1464 |
| | | | | 707/639 |
| 2015/0317212 | A1* | 11/2015 | Lee | G06F 11/1458 |
| | | | | 707/685 |
| 2016/0344834 | A1* | 11/2016 | Das | G06F 11/1474 |
| 2016/0350353 | A1* | 12/2016 | Li | G06F 16/2358 |
| 2016/0371319 | A1 | 12/2016 | Park et al. | |
| 2017/0116321 | A1 | 4/2017 | Jain et al. | |
| 2017/0116334 | A1* | 4/2017 | Kruglikov | G06F 16/951 |
| 2017/0177697 | A1 | 6/2017 | Lee et al. | |
| 2017/0220621 | A1 | 8/2017 | Colrain et al. | |
| 2018/0011893 | A1 | 1/2018 | Kimura | |

OTHER PUBLICATIONS

Craig Mullins, in-memory database management system (IMDBMS), Feb. 2015, <https://searchdatamanagement.techtarget.com/definition/in-memory-database-management-system-IMDBMS> (Year: 2015).*

Dushyanth Narayanan and Orion Hodson, "Whole-system Persistence", Mar. 2012, ACM, Seventeenth International Conference on Architectural Support for Programming Languages and Operating Systems (ASPLOS 2012) (Year: 2012).*

Pavlo, Andy, "15-721 Database Systems", Lecture #23 Non-Volatile Memory, dated Spring 2016, 70 pages.

Sang Hyuk Son et al., "Distributed Checkpointing for Globally Consistent States of Databases", IEEE Transactions on Software Engineering, vol. 15 No. 10, dated Oct. 1, 1989, pp. 1157-1167.

Jun-Lin Lin et al., "A Survey of Distributed Database Checkpointing", Distributed and Parallel Databases, vol. 5, No. 3, dated Jul. 3, 1997, pp. 289-319.

Jun-Lin Lin et al., "A Low-Cost Checkpointing Technique for Distributed Databases", Distributed and Parallel Databases, vol. 10, No. 3, dated Dec. 31, 2001, pp. 241-268.

Pelley et al., "Storage Management in the NVRAM Era", Proceedings of the VLDB Endowment, ACM vol. 7, No. 2, dated Oct. 1, 2013, pp. 121-132.

Huang Jian et al., "NVRAM-Aware Logging in Transaction Systems", Proceedings of the VLDB Endowment, vol. 8, No. 4, dated Dec. 1, 2014, pp. 389-400.

Taylor et al., U.S. Appl. No. 16/522,419, filed Jul. 25, 2019, Notice of Allowance dated Feb. 22, 2021.

Taylor et al., U.S. Appl. No. 16/522,419, filed Jul. 25, 2019, Notice of Allowance, dated Jun. 4, 2021.

Taylor et al., U.S. Appl. No. 16/522,419, filed Jul. 25, 2019, Notice of Allowability, dated Aug. 19, 2021.

Taylor, U.S. Appl. No. 16/522,419, filed Jul. 25, 2019, Notice of Allowability dated Nov. 8, 2021.

* cited by examiner

USING NON-VOLATILE MEMORY TO IMPROVE THE AVAILABILITY OF AN IN-MEMORY DATABASE

TECHNICAL FIELD

Embodiments described herein relate generally to databases, and more specifically, to techniques for increasing the efficiency of recovery operation within in-memory database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An in-memory database management system (IMDBMS) is a database management system (DBMS) that primarily relies on random access memory (RAM) for computer data storage. This is contrasted with block-based DBMSs that employ block-based persistent storage (block-based storage) as primary storage. In a block-based DBMS, database data is organized into data blocks. Database data in a block-based DBMS is manipulated by first reading the data blocks from block-based storage into in-memory buffers of the DBMS, modifying the data blocks in the buffers, and then rewriting the modified data blocks to block-based persistent storage.

IMDBMSs are faster than block-based DBMSs because access to block-based storage is slower than main memory access. However, a technical hurdle with a IMDBMS is the volatility of main memory, which comprises volatile random-access memory (RAM). In a system failure, database data and data structures used for transactional processing, which are stored in main memory, may be lost.

To enable recovery from such system failures, a IMDBMS may use persistent storage to store data that enables recovery. Such data includes change logs and checkpoint images. A checkpoint image is a periodically generated image of the database. A change log is used to store change records, each of which may store a description of a change that a transaction makes to the database and/or a description of action taking regarding the transaction (e.g. a commit). Recovery entails loading the entire latest checkpoint image into the IMDBMS and applying the change records (i.e., redo and undo change records) in the change log to synchronize the database to a state that existed just prior to the system failure.

The change records that are applied are generally for the "uncheckpointed" transactions that occurred after the last transaction captured by the latest checkpoint image. The time required to perform recovery for a system failure can be extensive because of the extensive time needed to reload an entire checkpoint image and the extensive time needed to apply the uncheckpointed transactions.

Described herein are techniques that dramatically reduce the time of recovery, thereby increasing the availability of an IMDBMS.

DETAILED DESCRIPTION

Overview

Figure 1:
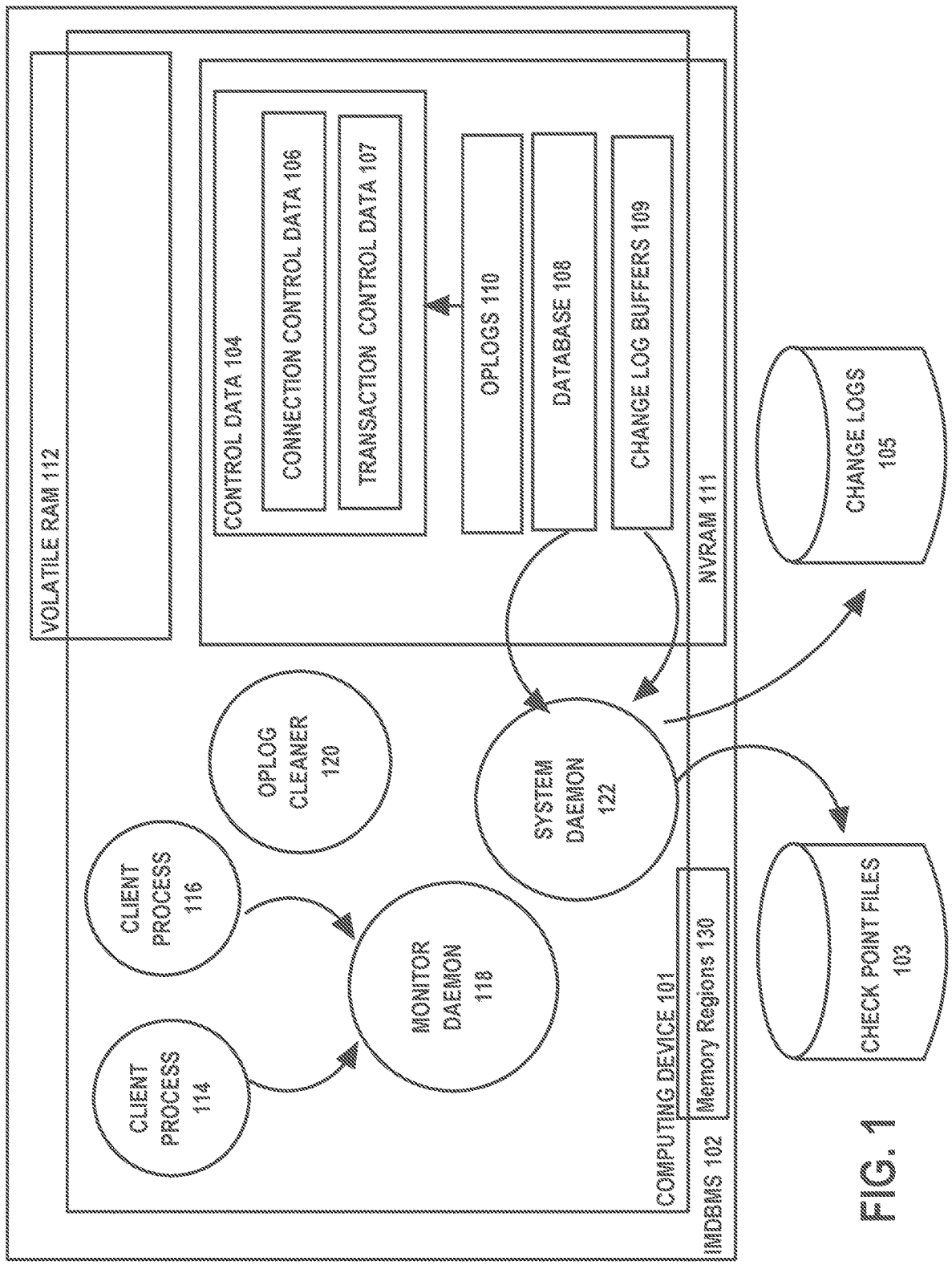
FIG. 1 is a diagram of a direct connection client server system, according to an embodiment of the invention.

Described herein is a novel approach that dramatically reduces time of recovery for an IMDBMS. The approach uses non-volatile random access memories (NVRAMs) to store database data and control data (e.g., transaction state information, latches on database data structures and control data structure). Because this data is stored in NVRAM, the data survives system failures. Recovery from a system failure may be accomplished much more quickly by, at least in part, modifying the surviving data in NVRAM as detailed below, rather than loading an entire checkpoint image and applying the uncheckpointed transactions needed to synchronize the database. Because in this form of recovery the database state that serves as the starting point for applying change records is the database as stored in the NVRAM, this form of recovery is referred to herein as in-memory-based recovery. Recovery, where the database state that serves as the starting point for applying change records is a checkpoint image, is referred to herein as checkpointed-based recovery. In-memory-based recovery eliminates or reduces the need to perform certain operations that are performed for checkpointed-based recovery, such as loading a database image in a checkpoint file into memory and applying a much larger volume of change records from block-based storage.

Like volatile RAM, NVRAM is byte addressable; an addressable byte or word may be loaded from NVRAM via a bus to a register of the hardware processor. NVRAM is described in the MEMORY OVERVIEW section.

Embodiments described herein are implemented on a IMDBMS that supports direct mode access by client processes. In direct mode, a client process can access a IMDBMS that is hosted on the computing element on which the client process is executing. Rather than sending a database request (e.g. query) over a network or by invoking a remote procedure call to another process running in a DBMS, the client process simply calls IMDBMS software through an API. The client process then executes the IMDBMS software to execute the request within the address space of the client process. An example of an IMDBMS that operates in direct mode is described in U.S. Pat. No. 7,739,244, "Operating Logging for Online Recovery in Shared Memory Information System", filed by Sanjay Veram, et al. on Oct. 14, 2004 as U.S. patent application Ser. No. 10/966,285, the entire contents of which are incorporated herein by reference and which may be referred to herein as the Oplogging Patent.

Embodiments of an IMDBMS described of herein are implemented using NVRAM to store at least part of a database. Unless specified otherwise, hereafter the term IMDBMS refers to a IMDBMS that supports direct mode and that stores at least part of a database in NVRAM.

In an embodiment, battery backed volatile RAM may be used in place of or addition to NVRAM 111 to persistently store control data 104, oplogs 110, database 108, and change log buffers 109.

Memory Overview

Because embodiments of the invention involve a novel use of a NVRAM, a description of memory is pertinent and useful. As used herein, "non-volatile" refers to a characteristic of a memory where data is retained in the absence of any form of electrical power, including external or battery backup. Examples of non-volatile memory include e-prom memory, flash memory, and disk memory. Non-volatile memory does not include volatile memory for which power is retained by a battery backup in the absence of another external power source. For example, volatile memory coupled to a board with an embedded battery-backup is not non-volatile memory, because, without the power provided by a battery, the volatile memory does not retain data.

Byte-addressable memory is distinguishable from block-addressable memory. A byte or word is the minimum amount of data that may be addressed, retrieved from memory, or written to in byte-addressable memory. To manipulate one or more bits in a byte or word, a byte or word containing the bit must be fetched to a register of a processor executing a machine instruction that references the byte or word and manipulated according to the machine instruction or another machine instruction.

In contrast, the minimum size for a unit of block-addressable memory is a data block. A data block comprises multiple bytes and multiple words and cannot be entirely stored within a register of a processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

Using NVRAM

In order for a process to access a region of NVRAM, the region of NVRAM is attached to the process. Attaching refers to mapping a virtual address space of a process to an address space of the NVRAM. The mapping may be stored in for example, an MMU (memory management unit). An address space of NVRAM may be interleaved across multiple memory modules (e.g. dual inline memory module).

According to embodiment of the present invention, a process is attached to a region of NVRAM using a protocol similar that used for memory mapped files. An example of such a protocol is DAX (Direct Access). A mmap( ) function may be called with an argument specifying the address space of the region of NVRAM. Using NVRAM is described in *Introduction to Programming with Persistent Memory from Intel*, by U. Usharani and Andy Rudoff, published on Aug. 14, 2017, the contents of which are incorporated by reference, and in *Persistent Memory Programming*, by Andy Rudoff, published Summer in 2017 "; login:", the contents of which are incorporated herein by reference. NVRAM is referred to persistent memory in these publications.

Structural Overview

FIG. 1 shows an IMDBMS 102, an IMDBMS according to an embodiment of the present invention. IMDBMS 102 is hosted on computing device 101, which comprises NVRAM 111 and volatile RAM 112 and one or more processors (not shown).

Database 108, which is managed and accessed by IMDBMS 102, includes NVRAM 111. Changes to database 108 are recorded in change records (redo and undo records) in change logs 105. Change records are staged in log buffers 109, from where the system daemon 122 writes change records to change logs 105.

On a periodic basis, a checkpoint image of database 108 is stored in checkpoint files 103. Change logs 105 and checkpoint files 103 are stored in block-based storage, while log buffers 109 are stored in NVRAM.

Storing log buffers 108 in NVRAM enables faster durable commits. A transaction is durably committed when a change record, referred to as a commit record, is durably stored (assuming all change records for the transaction have also been durably stored). By using NVRAM to store log buffers, a transaction is durably committed when the commit record is written to the log buffer, rather than when written to change logs 105, which can take much longer.

Client process 114 and 116 are client processes executing on computing device 101. Client process 114 and 116 may access IMDBMS 102 in direct mode.

Daemon processes are processes that do not serve any particular client but that are launched by IMDBMS 102 to perform system-wide management and maintenance tasks. System daemon 122 represents one or more daemon processes that perform system-wide tasks, such as periodically writing records from log buffers 109 to change logs 105 and creating checkpoint files.

An important daemon process is monitor daemon 118, which plays a role in detecting client process failures. According to an embodiment, client process 114 and client process 116 establish a connection with monitor daemon 118, using a remote process connection mechanism of an operating system of computing device 101. Client process failure is detected by monitor daemon 118 when monitor daemon 118 finds that the connection to the client has been closed unexpectedly.

Control data 104 is data used by processes, including client processes 114 and 116, to manage actions against database 108. Such actions include initiating transactions, committing transactions, changing data within database 108, and opening cursors. Examples of control data include information to control concurrency, permissions, and access.

In particular, control data 104 includes connection control data 106 and transaction control data 107. Transaction control data 107 includes data used for transaction control. Examples of transaction control data can include a table of open transactions and the state of each transaction, synchronization primitives (e.g., locks, semaphores) held on database data structures (table, rows, column segments) and on log buffers.

Connection control data 106 includes data used for connection control. Examples of connection control data include a list of each connection established with monitor daemon 118 by a client process, and for each connection, an identification of the client connection, and a mapping between each connection and one or more transactions open for the connection in transaction control data 107.

Memory Segments

Memory segments 130 is a mapping that maps regions of NVRAM to persistent data structures of IMDBMS 102. The mapping maps one or more segments for storing database 108 to address spaces of NVRAM regions, one or more segments for storing control data and oplogs to address spaces of one or more NVRAM regions, one or more segments for storing change log buffers to address spaces of NVRAM regions. When a process within IMDBMS is launched, the process is attached to regions of NVRAM using memory segments 130 and, for example, the mmap( ) function.

Oplogging

When a client process executes a transaction, changes made to database 108 are recorded to change logs 105. When a client process fails, database 108 needs to be placed to a consistent state, which may entail using change records to rollback changes made by uncommitted transactions.

Similarly, operations executed by a client process change control data 104. Such operations include operations performed while executing a transaction. When a client process fails, control data 104 should also be brought back to a consistent state.

Oplogs 110 record information that is key to bringing control data to a consistent state. Hence, an operation that brings control data 104 to a consistent state is referred to herein as oplog recovery. Oplog recovery is performed to not only bring control data 104 to a consistent state, but also database 108.

Important to oplog recovery are "critical sections". A critical section is a section of IMDBMS software where the unexpected exit or failure of a process executing the section of software (e.g. client process may leave control data in an inconsistent state) can leave control data in an inconsistent state. Each critical section is protected by an oplog, which is a record generated by a client process to record information that may be used to undo changes to control data or actions made by the client process while executing the critical section.

An oplog generated for a critical section is tailored for the critical section. Thus, content of oplogs generated for different critical sections varies. A critical section may cause a client process to generate synchronization primitives, including synchronization primitives on the control data. Oplog recovery may include releasing the synchronization primitives. Oplogs and oplog recovering for client processes are described in the Oplogging Patent.

The operation of creating oplogs for the purpose of oplog recovery is referred to herein as oplogging. The operation a process performs by executing a critical section that generates an oplog is referred to herein as an oplogged operation.

Oplog cleaner process 120 is a daemon process responsible for oplog recovery. Oplog cleaner 120 process is launched by monitor daemon 118 when monitor daemon 118 detects, through the connection established by the client process with monitor daemon 118, that the client process has failed. Oplog cleaner process 120 examines any oplog generated by the client process to bring the affected control data to a consistent state. Such actions include releasing synchronization primitives 104 held by the client process on database structures of database 108.

Bringing control data to a consistent state may require changing other data within a IMDBMS back to a consistent state. For example, changing a row in database 108 is an oplogged operation requiring a synchronization primitive on the log buffer to write a change record and synchronization primitive on the row in database 108.

As a result of a client process failure, an oplog generated for the oplog operation indicates the change record was written to change log buffers 109. However, a synchronization primitive is held on the database row, and the oplog does not indicate the row was changed. Oplog recovery thus also requires applying the change record to change the row and releasing the synchronization primitive on the row.

Oplog Recovery for Daemons

Oplog recovery has been described in the context of client-process-level recovery, where recovery is effected for failures at the level of a client-process failure. A daemon process may also fail. To recover from a system failure, oplogging and oplog recovery are performed for the daemon process.

Daemon processes are processes that do not serve any specific client but that are launched by IMDBMS 102 to perform system-wide management and maintenance tasks, such as periodically generating and storing a checkpoint image of database 108 in checkpoint file 103 and periodically writing change records from log buffer 109 to change logs 105. When a daemon process fails in the middle of an operation, oplog recovery should be performed for the daemon process.

On a periodic basis, a daemon process stores a checkpoint image of database 108 in checkpoint files 103. When a daemon process fails while storing a checkpoint image, an oplog is generated. Oplog cleaner process 120 examines the oplog and completes the checkpoint process. An oplog may indicate at what point the writing of the checkpoint has progressed. Oplog recovering would entail continuing writing the checkpoint after that point.

Similarly, on a periodic basis, a daemon process flushes records from log buffers 109 to change logs 105. While writing a record to log buffers 109, an oplog is generated. Oplog cleaner process 120 examines the oplog and completes the process. An oplog may indicate at what point the flushing of log buffers has progressed, which log buffers have been fully flushed to change logs 105 and/or at what point the flushing of another log buffer has progressed. Oplog recovering writes change records from this log buffer 109 to change logs 105.

Like a client process, a daemon process establishes a monitor daemon 118. This enables the detection of failure of a daemon process and performance of oplog recovery for the daemon process upon detection of the failure.

Process—Control Data Relationships

In-memory-based recovery involves use of control data structures that survive system failures because the control data is stored in NVRAM. To explain in-memory-based recovery, it is useful to highlight the further details about control data structures and the relationship between control data structures and processes running on IMDBMS.

Figure 2:
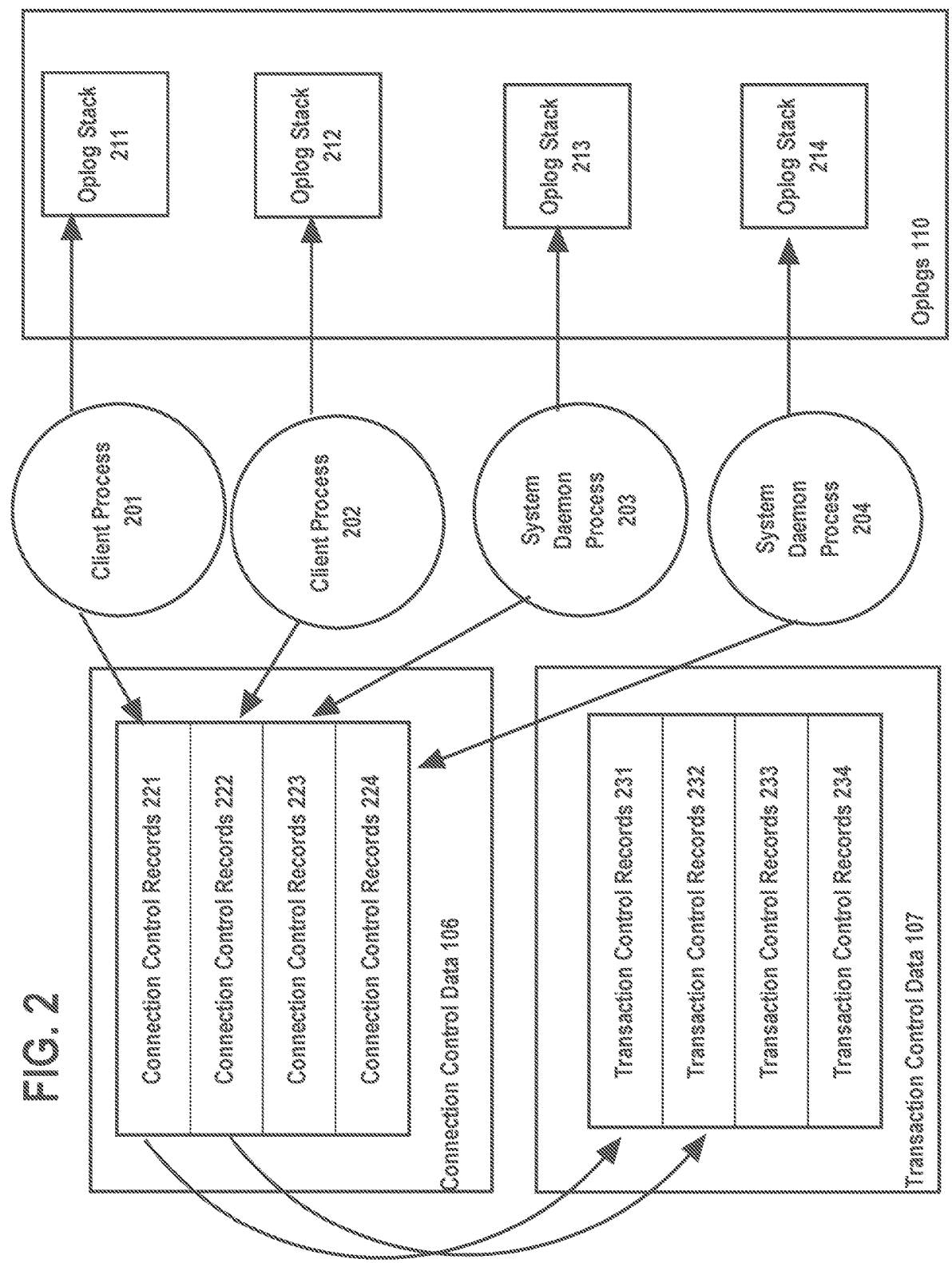
FIG. 2 shows an example of a connection control data, transaction control data, and "oplog stacks" maintained for client processes and daemon processes, according to an embodiment of the invention.

FIG. 2 shows an example of a connection control data, transaction control data, and "oplog stacks" maintained for client processes and daemon processes. Connection control data 106 comprises data used for connection control. For each client process and daemon process, respective connection control records are maintained in connection control data 106.

Transaction control data 107 includes transaction control records. For a client process, there may be a respective transaction control record. A transaction control record includes information about a transaction being executed by a client process. Such information includes the state or status of the transaction, synchronization primitives (e.g. locks, semaphores) held on database data structures (table, rows, column segments) for the transaction, and the begin time of the transaction.

Each control record for a process's connection includes connection control data. In the example of FIG. 2, connection control data for client process 201 is stored in connection control records 221 and connection control data for client process 202 is stored in connection control records 222. Similarly, connection control data for system daemon process 203 is stored in connection control records 223 and connection control data for system daemon process 204 is stored in connection control records 233.

Examples of connection control data stored in a connection record include an identification of the client connection, and a reference to a transaction record of transactions open for the connection, if any. In the example of FIG. 2, connection control record 221 for client process 201 refers transaction control record 231 for client process 201 and connection control record 222 for client process 202 refers transaction control record 232 for client process 202.

For each client and daemon processes, oplogs 110 may include a stack of oplogs ("oplog stack"). While a process is executing an oplogged operation, the process may call a second critical section. When this occurs, oplogs are stacked, with the oplog for the second critical section being added to the top of the stack. When the process exits the second critical section, the oplog for the second critical section is removed from the stack.

Recovery Operation in Persistent Memory

Figure 3:
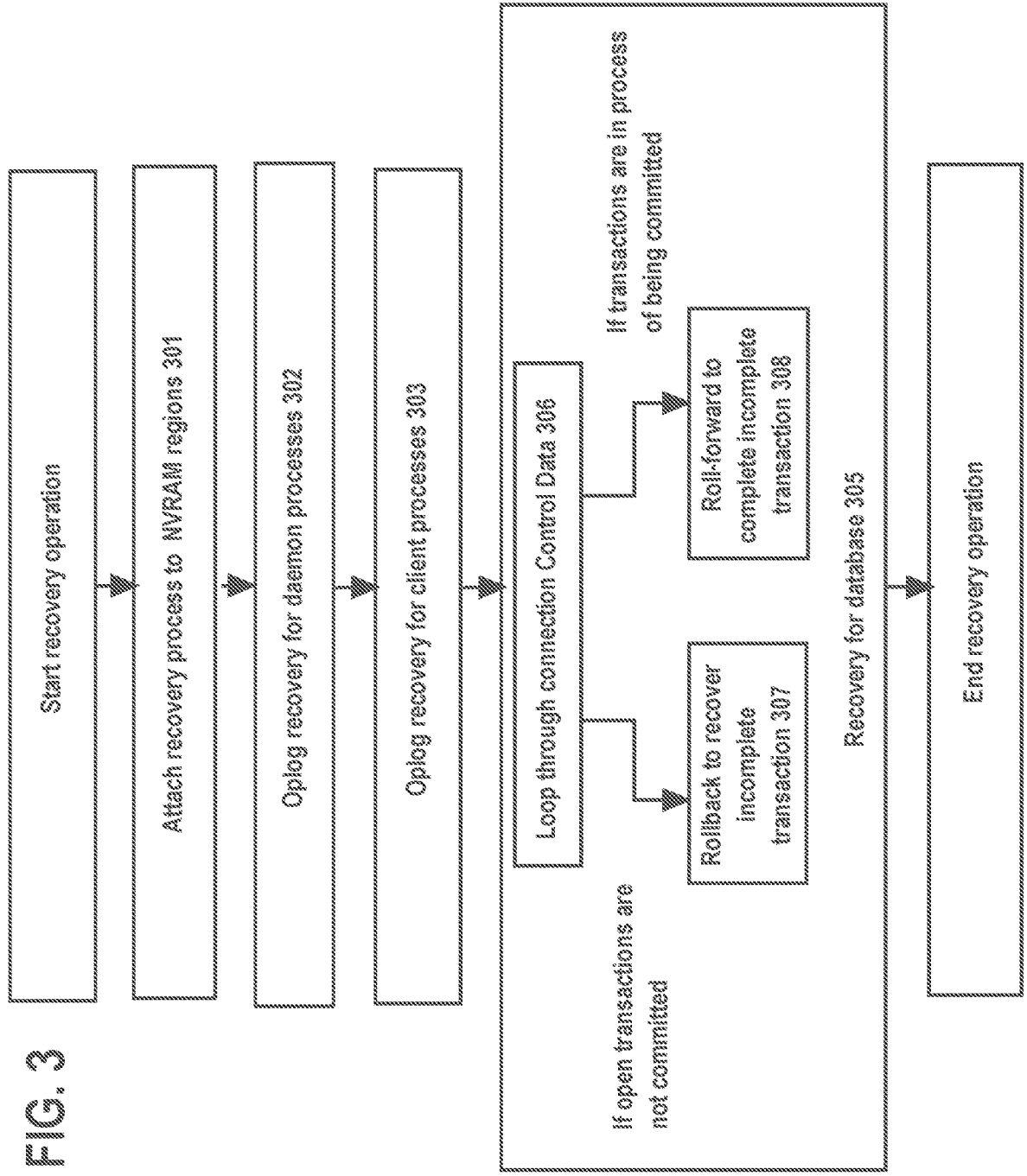
FIG. 3 shows a procedure for in-memory-based recovery.

FIG. 3 shows a procedure for in-memory-based recovery. Initially, a recovery process attaches the NVRAM regions mapped by memory segments 130. (301) This includes attaching one or more NVRAM regions storing database 108 to the recovery process by using, for example, the function mmap( ).

In addition, the following operations are performed. Oplog recovery for daemon process (302), oplog recovery of a client process (303), and recovery of database 108 (305). Oplog recovery for client process and Oplog recovery for daemon process are detailed in OPPLOGGING section and OPLOG RECOVERY FOR DAEMONS section. Recovery of database 108 is explained as follows.

Database 108 needs to be synchronized to the state of transactions at or right before a system failure. Recovery for database 108 consists of the following steps: loop through connection control data and examine the linked transaction. (306) If the transaction is not committed, the transaction is rolled back by applying undo change records to database 108. (307) If the transaction is committed, the transaction is rolled-forward. (308)

It should be noted that oplog recovery may have also applied change records as previously described. If an oplog stack indicates an oplogged operation was making a modification to the database, an undo record may be applied.

Limited Rolling Forward

Under in-memory-based recovery, rolling forward a transaction is much more limited than under checkpoint-based recovery. The reason for this difference is that database 108 survives a failure and changes made by transactions after generation of the latest checkpoint image are reflected in the database. On the other hand, under checkpoint-based recovery, recovery begins with the state of the database as reflected in a checkpoint image. Thus, recovery entails applying change records beginning at a point that corresponds to when the checkpoint was created. As a result, many more change records need to be read and applied. Furthermore, the change records need to read from block-based storage.

In an embodiment of the present invention, in-memory-based recovery, only a "last-in" change record may need to be applied to roll forward a committed transaction. A reason for this is write ahead logging (WAL), which is used to make changes to database 108.

Under WAL, when a change is made to database 108 for which a change record is generated, the change record is first persisted by writing the change record to log buffer 109. After writing the change record to log buffer 109, the change is then made to the database 108. When making a series of changes to database 108 for a transaction, each change is processed in this way. When a failure occurs, it will occur during the last change in the series, with all previous changes in the series already being persistently made to database 108. If failure occurs after writing change record for the last change, then only that change record for the last transaction needs to be applied to roll forward a transaction.

In addition, making a change is an oplog operation. Thus, the transaction is rolled back as a result of oplog recovery.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
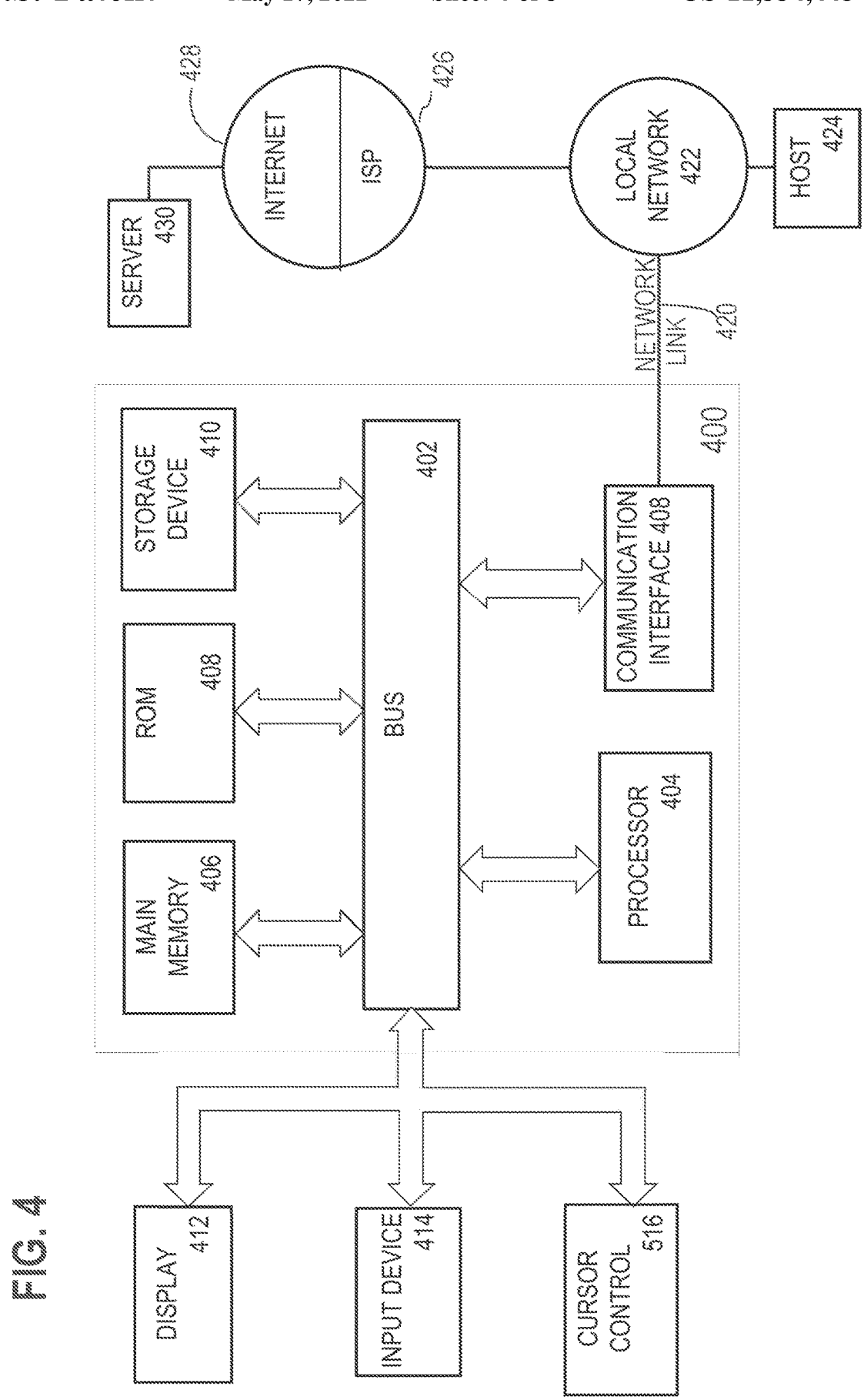
FIG. 4 is a diagram depicting a computer system that may be used to implement an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 5:
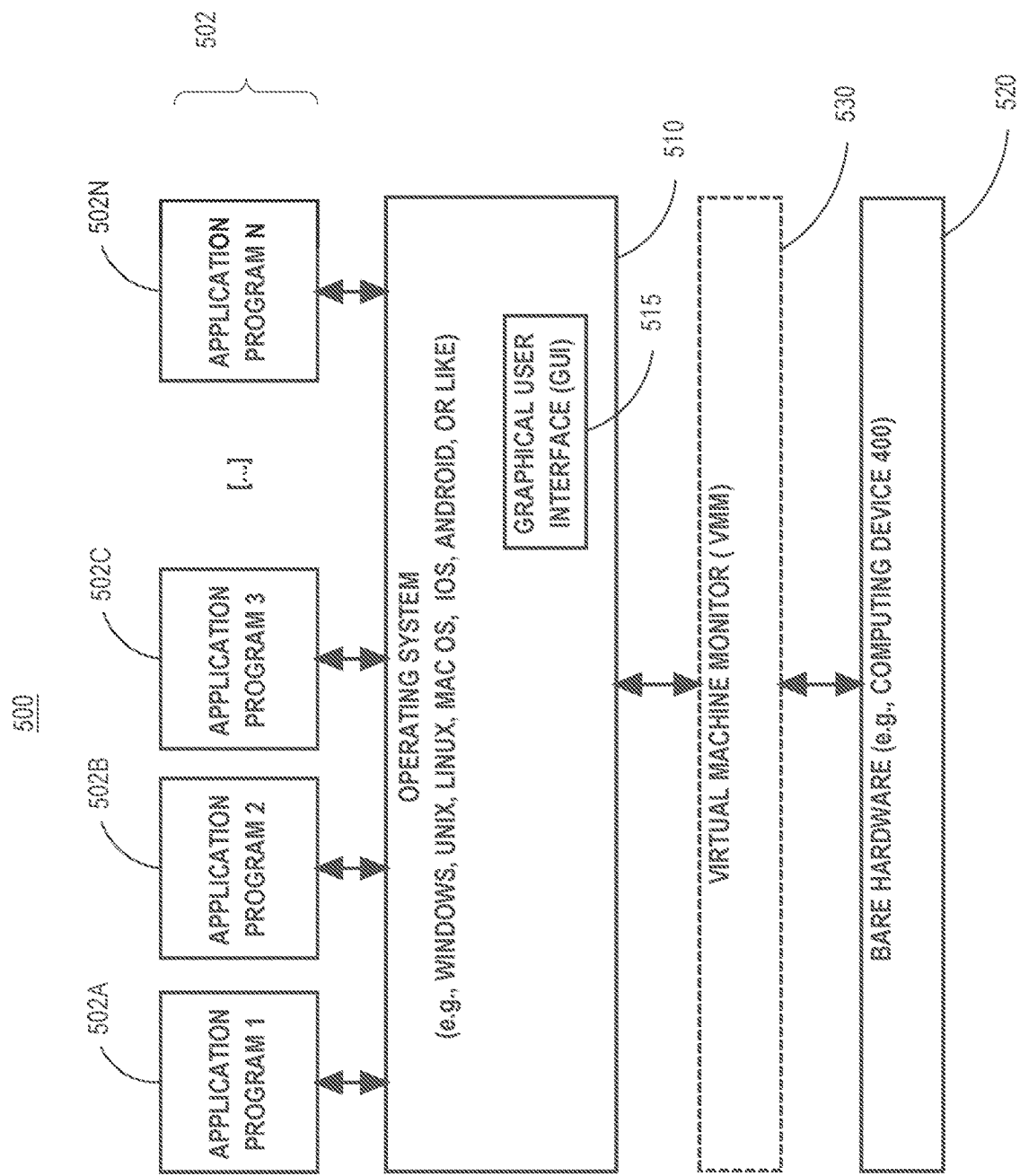
FIG. 5 depicts a software system that may be employed for controlling the operation of a computer system according to an embodiment of the present invention.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). DBaaS was described earlier.

The invention claimed is:

1. A method, comprising:
    storing an in-memory database in NVRAM of a DBMS;
    generating a checkpoint that stores an image of said database;
    storing transaction control data in said NVRAM, said transactional control data including information about multiple transactions being executed on said DBMS;
    after generating said checkpoint, executing a plurality of transactions that make a plurality of changes to said database that are not reflected in said checkpoint;
    for each transaction of said plurality of transactions:
        making a respective series of changes of said plurality of changes to said database,
        for each change of said respective series of changes:
            writing a change record to a log buffer stored in said NVRAM;
            after writing said change record, making said each change to said database stored in said NVRAM;
    recovering said database using said transactional control data, wherein recovering said database includes:
        rolling forward a first transaction of said plurality of transactions that is committed, wherein rolling forward said first transaction includes:
            reading a last change record generated for a last change that was last made in the respective series of changes made for said first transaction; and
            applying said last change record to said database without applying any other change record generated for said respective series of changes made for said first transaction while performing said recovering said database.

2. The method of claim 1, further including durably committing a transaction of said plurality of transactions, wherein durably committing a transaction includes storing a commit record in said log buffer, wherein said transaction is durably committed before said commit record is stored to a log file stored in block-storage.

3. The method of claim 1, further including:
storing connection control data in said NVRAM;
a plurality of client processes each establishing a respective connection of a plurality of connections with said DBMS;
wherein said connection control data includes, for said each connection of said plurality of connections, a respective connection record of a plurality of connection records of a connection log;
wherein each connection record of said connection log identifies a transaction record stored in said transaction control data for a transaction being executed by a respective client process of said connection record.

4. The method of claim 3, for a first client process of said plurality of client processes, detecting a failure through a respective connection of said first client;
in response to detecting said failure:
examining a first oplog that was stored in said NVRAM by said first client process, said first oplog indicating one or more changes to said connection control data;
synchronizing said database based on said first oplog.

5. The method of claim 3, further including:
while performing an oplogged operation, a daemon process generating a second oplog, indicating that said daemon is performing said oplogged operation;
wherein said recovering said database includes, based on said second oplog, completing said oplogged operation.

6. The method of claim 1,
wherein said recovering said database includes attaching to an area of said NVRAM that stores a portion of said database;
wherein before said recovering said database, said area of said NVRAM stores said portion of said database.

7. The method of claim 1,
wherein a plurality of change records include:
an earlier subset of change records reflecting an earlier subset of changes of said plurality of changes, and
a later subset of change records reflecting a later subset of changes of said plurality of changes, wherein said earlier subset of changes occur before said later subset of changes;
wherein recovering said database includes:
using said transaction control data to determine which change records of said later subset of change records to apply to said database;
beginning with said later subset of change records, applying change records in said plurality of change records to said database in place without applying said earlier subset of change records to recover said database.

8. A non-transitory computer-readable storage medium storing sequences of instructions that, when executed by one or more processors, cause:
storing an in-memory database in NVRAM of a DBMS;
generating a checkpoint that stores an image of said database;
storing transaction control data in said NVRAM, said transactional control data including information about multiple transactions being executed on said DBMS;
after generating said checkpoint, executing a plurality of transactions that make a plurality of changes to said database that are not reflected in said checkpoint;
for each transaction of said plurality of transactions:
making a respective series of changes of said plurality of changes to said database,
for each change of said respective series of changes:
writing a change record to a log buffer stored in said NVRAM;
after writing said change record, making said each change to said database stored in said NVRAM;
recovering said database using said transactional control data, wherein recovering said database includes:
rolling forward a first transaction of said plurality of transactions that is committed, wherein rolling forward said first transaction includes:
reading a last change record generated for a last change that was last made in the respective series of changes made for said first transaction; and
applying said last change record to said database without applying any other change record generated for said respective series of changes made for said first transaction while performing said recovering said database.

9. The non-transitory computer-readable storage medium of claim 8, the sequences of instructions including instructions that, when executed by one or more processors, cause durably committing a transaction of said plurality of transactions, wherein durably committing a transaction includes storing a commit record in said log buffer, wherein said transaction is durably committed before said commit record is stored to a log file stored in block-storage.

10. The non-transitory computer-readable storage medium of claim 8, the sequences of instructions including instructions that, when executed by one or more processors, cause:
storing connection control data in said NVRAM;
a plurality of client processes each establishing a respective connection of a plurality of connections with said DBMS;
wherein said connection control data includes, for said each connection of said plurality of connections, a respective connection record of a plurality of connection records of a connection log;
wherein each connection record of said connection log identifies a transaction record stored in said transaction control data for a transaction being executed by a respective client process of said connection record.

11. The non-transitory computer-readable storage medium of claim 10, the sequences of instructions including instructions that, when executed by one or more processors, cause:
for a first client process of said plurality of client processes, detecting a failure through a respective connection of said first client;
in response to detecting said failure:
examining a first oplog that was stored in said NVRAM by said first client process, said first oplog indicating one or more changes to said connection control data;
synchronizing said database based on said first oplog.

12. The non-transitory computer-readable storage medium of claim 10, the sequences of instructions including instructions that, when executed by one or more processors, cause:
while performing an oplogged operation, a daemon process generating a second oplog, indicating that said daemon is performing said oplogged operation;

wherein said recovering said database includes, based on said second oplog, completing said oplogged operation.

13. The non-transitory computer-readable storage medium of claim 8,
wherein said recovering said database includes attaching to an area of said NVRAM that stores a portion of said database;
wherein before said recovering said database, said area of said NVRAM stores said portion of said database.

14. The non-transitory computer-readable storage medium of claim 8,
wherein a plurality of change records include:
an earlier subset of change records reflecting an earlier subset of changes of said plurality of changes, and
a later subset of change records reflecting a later subset of changes of said plurality of changes, wherein said earlier subset of changes occur before said later subset of changes;
wherein recovering said database includes:
using said transaction control data to determine which change records of said later subset of change records to apply to said database;
beginning with said later subset of change records, applying change records in said plurality of change records to said database in place without applying said earlier subset of change records to recover said database.

\* \* \* \* \*